(12) United States Patent
Cinghita et al.

(10) Patent No.: US 7,840,651 B2
(45) Date of Patent: **\*Nov. 23, 2010**

(54) CLIENT-SERVER EMULATION SUPPORTING MULTICAST TRANSMISSIONS OF MEDIA OBJECTS

(76) Inventors: Luchiana Cinghita, Casa Filippo, Arosio (CH) CH-6939; Ralf Battenfeld, Eichmatt 1, Rotkreuz (CH) 6343; Roberto Genini, Via Cantonale 35b, Manno (CH) 6928; Marco Porta, San Leonardo, Contone (CH) CH-6594

( * ) Notice: Subject to any disclaimer, the term of this patent is extended or adjusted under 35 U.S.C. 154(b) by 129 days.

This patent is subject to a terminal disclaimer.

(21) Appl. No.: 11/833,910

(22) Filed: Aug. 3, 2007

(65) Prior Publication Data

US 2008/0056256 A1    Mar. 6, 2008

Related U.S. Application Data

(63) Continuation of application No. 10/470,579, filed on Sep. 4, 2002, now Pat. No. 7,383,345.

(51) Int. Cl.
G06F 13/00 (2006.01)

(52) U.S. Cl. .................... 709/219; 709/236; 709/250

(58) Field of Classification Search ................ 709/217, 709/219, 230, 231, 236, 238, 245, 250
See application file for complete search history.

(56) References Cited

U.S. PATENT DOCUMENTS

| | | | |
|---|---|---|---|
| 6,101,180 A | 8/2000 | Donahue et al. | |
| 6,144,996 A | 11/2000 | Starnes et al. | |
| 6,181,697 B1 * | 1/2001 | Nurenberg et al. | 370/390 |
| 7,028,071 B1 * | 4/2006 | Slik | 709/201 |
| 7,028,096 B1 | 4/2006 | Lee | |
| 7,054,902 B2 * | 5/2006 | Toporek et al. | 709/203 |
| 7,161,934 B2 * | 1/2007 | Buchsbaum et al. | 370/382 |
| 2002/0001310 A1 * | 1/2002 | Mai et al. | 370/390 |
| 2002/0091792 A1 | 7/2002 | Janniello et al. | |

(Continued)

*Primary Examiner*—Viet Vu
(74) *Attorney, Agent, or Firm*—Perkins Coie LLP (57) ABSTRACT

A system and method for broadcasting multicast transmissions of data content over a unidirectional network between a single server that executes a server process application and a plurality of clients, each of which executes a client process application. On the server side, the server includes a client emulator that executes a client emulator process application to convert unicast form data to multicast form data and on the client side each client operates in response to an emulator that executes a server emulator process application. Transmission of the data content takes place between the client emulator process on the server side and the server emulator process on the client side. Each client also includes and operates a client process application that receives data content from the server emulator process on the client side. On the client side, each client can have its own server emulator process or there can be a common server emulator process used by the client process application of all of the clients or groups of clients using a dedicated server emulator process for each group. The invention achieves multicast broadcast over a unicast network replacing the need for bi-directional networks and eliminates the need for a back channel and the need to send multiple copies of the data, thereby reducing the need for bandwidth and solving the problem of scalability of existing systems to broadcast multicast.

45 Claims, 7 Drawing Sheets

U.S. PATENT DOCUMENTS

| | | | |
|---|---|---|---|
| 2002/0143951 A1* | 10/2002 | Khan et al. | 709/227 |
| 2002/0178221 A1 | 11/2002 | Yaport et al. | |
| 2003/0014531 A1 | 1/2003 | Bodin et al. | |
| 2003/0093511 A1 | 5/2003 | Barde et al. | |
| 2003/0195964 A1* | 10/2003 | Mane | 709/227 |
| 2005/0259682 A1 | 11/2005 | Yosef et al. | |
| 2006/0031557 A1* | 2/2006 | Walsh et al. | 709/232 |

\* cited by examiner

CLIENT-SERVER EMULATION SUPPORTING MULTICAST TRANSMISSIONS OF MEDIA OBJECTS

CROSS-REFERENCE TO RELATED APPLICATIONS

This application is a Continuation of U.S. patent application Ser. No. 10/470,579, filed Sep. 4, 2002, to which the benefit of priority is claimed and the entirety of which is incorporated herein by reference.

FIELD OF THE INVENTION

The present invention relates to the field of transmitting real time content over IP multicast networks using only unidirectional transmission from a server to a client without content requests from the client to the server. The invention uses emulation processes at the client and server to permit support of unidirectional transmission.

BACKGROUND OF THE INVENTION

An Internet Protocol (IP) specifies the format of packets, also called datagrams, that are to be broadcast and the addressing scheme. The transmission of a single (the same) message to a select group of recipients is called a multicast. Transmission of the message to only one recipient is called a unicast transmission. A system and method currently exists for enabling UDP (User Datagram Protocol) unicast transmissions over IP multicast networks. UDP is a connectionless protocol which is part of the TCP/IP protocol suite. TCP/IP is the Transmission Control Protocol that enables two hosts to establish a connection and exchange streams of data. Unlike TCP/IP, UDP/IP provides very few error recovery services, offering instead a direct/fast way to send and receive datagrams over an IP network. It is used primarily for broadcasting messages over a network. A UDP unicast transmission is considered to be a communication session involving two hosts, a client and a server. In a typical scenario, the client contacts the server requesting the transmission of the content of a file. The content can be any type of data in any form, such as desired files, or streaming data such as audio and video. As a response, the server sends the content in form of a stream of UDP datagrams to the client. A UDP datagram consists of a UDP+IP header and data.

The client is responsible for maintaining the session alive by periodically sending an appropriate message to the server, such as a "heart beat", or repetitive, type signal that reiterates the client's continued interest in receiving the transmission and confirms the client availability to receive content from the server.

Figure 1:
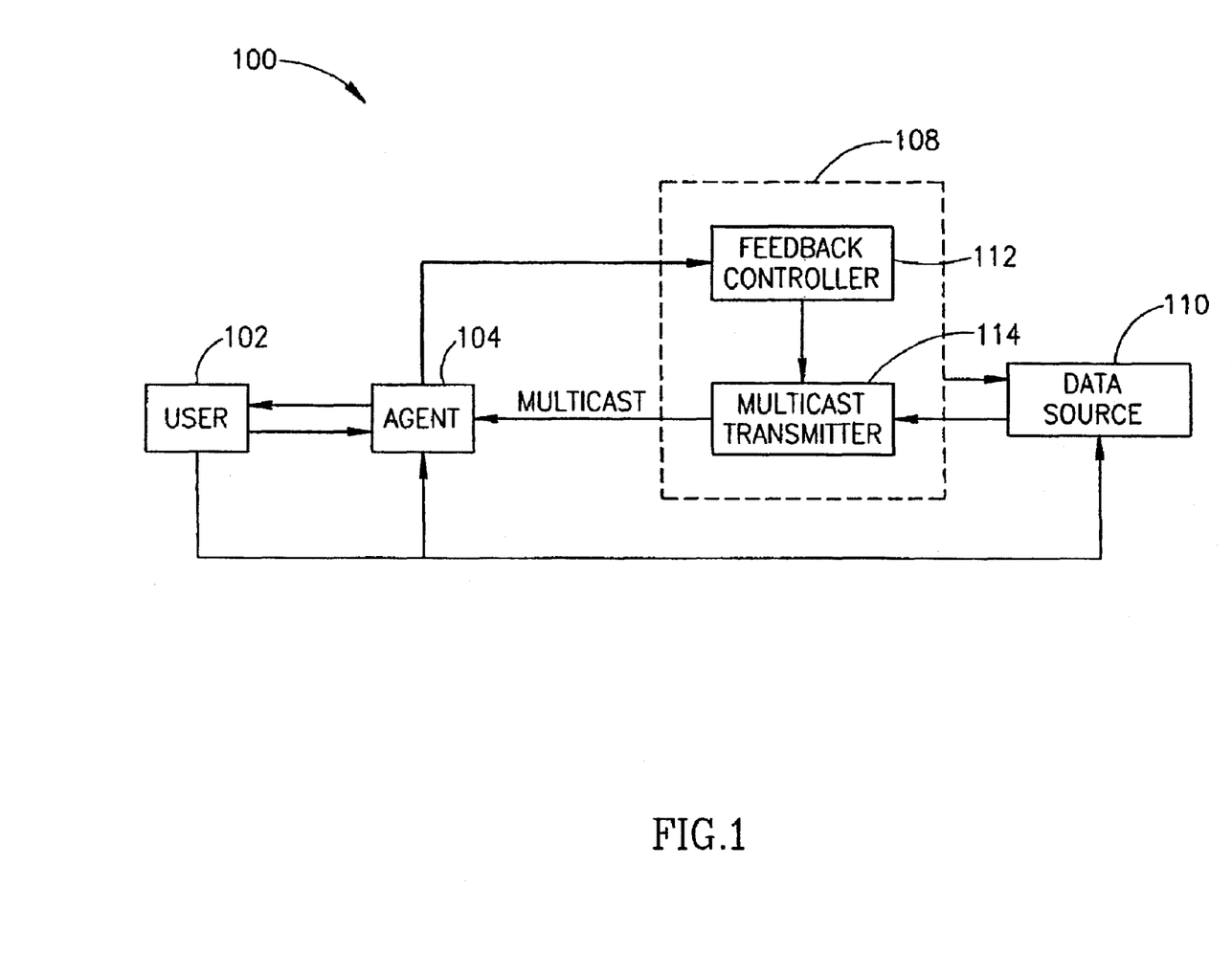
FIG. 1 is a diagram illustrating data flow in a conventional unicast between a Server and a Client.
Figure 2:
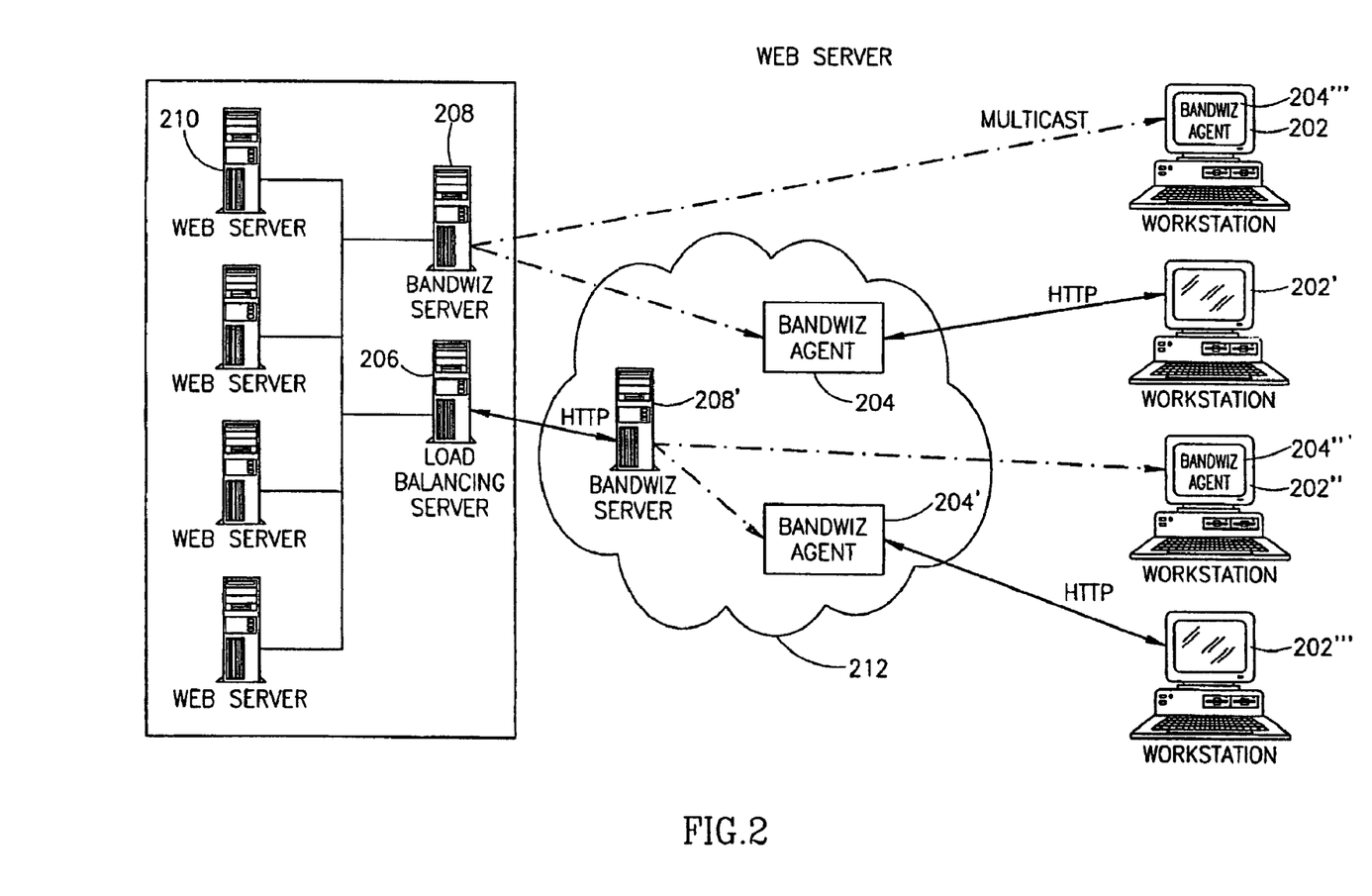
FIG. 2 is a diagram illustrating the sequence of data transmission between the Server and Client in the system of FIG. 1.

FIG. 1 illustrates how the existing technology works. This shows a classical configuration with a Server host 100 communicating with a Client host 120 over an IP network 110. The network 110 is typically the Internet, an Intranet or any other network supporting the TCP/IP protocol suite. As shown in FIG. 2, the Server host 100 is hosting a Server Process 220 for communicating with a Client Process 230 hosted on the Client host 120 following an application protocol based on UDP. The term Process means a conventional application program, or task, that here is executed by each of the Server and Client. The client process is the program (or the player) responsible as well for data consuming or displaying as for maintaining alive the communication session with the server. the server process is the program responsible to manage and distribute the requested data. All of this is conventional in the art. For example, the application protocol, or Process, typically can be a streaming protocol or any other real time protocol that implements a message flow. Examples of such a protocol are Microsoft Media Server protocol (MMS), RSTP as used by Real Networks, Xing Technologies XDMA protocol or RTP real time data protocol delivering real time information of any type.

As seen in FIG. 2, starting from the top and moving downward, in a typical scenario the message content flow is initiated by the Client 120 sending a request message REQ to the Server 100 indicating the desire to receive specific content and, for that purpose, specifying the IP address of the Client host 120 and the local port on which data is expected to be received. This message has the effect of establishing a session at application level between the Server Process 220 and Client Process 230. The Server Process 220 accepts the request by sending the desired content in a series of DATA messages to the Client Process 230.

In order to maintain the session alive, the Client Process 230 periodically sends a "heart beat" message signal HB to the Server Process 220 for the purpose of reassuring the Server about its availability and interest in to continue to receive the specific content. The time interval between two successive heart beat messages depends on the specific client-server application protocol. The Server Process 220 is configured such that if it does not receive a HB message in the expected time frame, it will stop sending DATA messages to the Client Process 230, thereby terminating the communication session.

Once all of the content has been completely transferred, i.e., the last DATA message has been sent from the Server to the Client, the Server Process 220 may send a CLOSE message to the Client Process 230, this for actively indicating that the session is terminated. Alternatively, the Client Process 230, in the absence of receiving DATA messages within a given time frame, will imply that either the transmission is complete or the connection to the Server Process 220 has been lost. Similarly, a Client wishing to interrupt the session instructs the Client Process 230 to send an ABORT message to the Server Process 220 or can simply stop sending HB messages.

Figure 3:
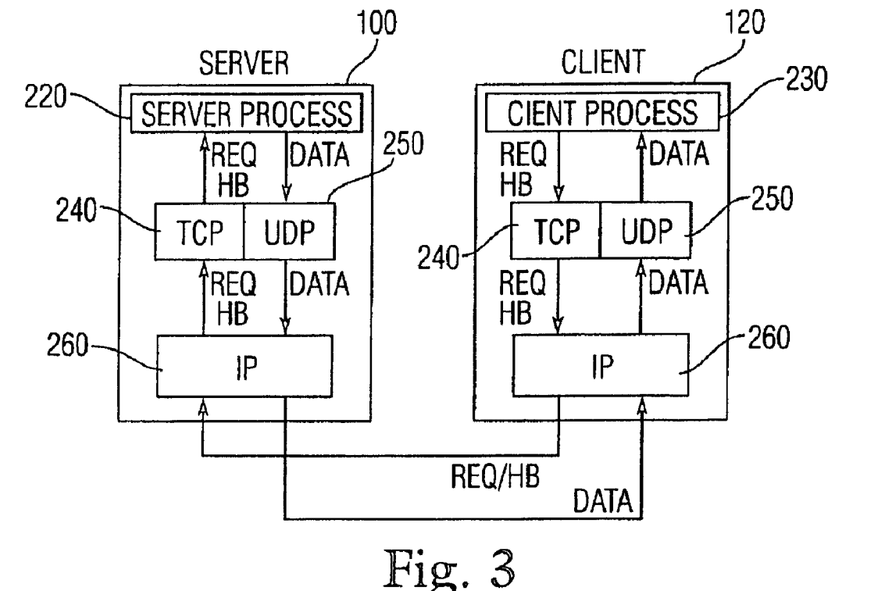
FIG. 3 is a diagram illustrating the data flow during communication between the Server and Client in the system of FIG. 1.

FIG. 3 illustrates a typical scenario of how components on the Server 100 and Client 120 communicate. The Server Process 220 has a unique name associated with it which translates into a corresponding network-wide address. The translation procedure is carried out by a process known as the "domain name server" (DNS) on request of the Client Process 230. The resulting network-wide address of the Server Process 220 consists of two parts: the network-wide IP address of the Server host 100 and a local port number locally associated to the Server Process 220.

The operation of translating a domain name into a network-wide IP address is necessary only if the Server host 100 is known by domain name and not by IP address. Once the Client Process 230 knows the network-wide address of the Server Process 220, it is ready to initiate the communication. For that purpose, the Client Process 230 sends a message REQ to the Server Process 220 according to the protocol described above. An REQ message is typically sent by the Client 110 over a reliable transport control protocol 240, e.g., TCP, in order to increase the probability of successfully establishing a communication session with the Server 100.

Whenever a system has been designed to operate under less stringent requirements, the Client Process 230 can send the same REQ message over a transport protocol such as UDP, which is less reliable than, for example, TCP/IP, i.e., no data packet checking and/or redundancy. The user datagram protocol offers only a minimal transport service without guarantee of datagram delivery. It gives applications direct access to the datagram service of the IP layer. UDP is used by applications that do not require the level of service of TCP or that wish to use communications services (e.g., multicast or broadcast delivery) not available from TCP. UDP is almost a null protocol. The only service it provides over IP are check-summing of data and multiplexing by port number. Therefore, an application program running over UDP must deal directly with end-to-end communication problems that a connection-oriented protocol would have handled, e.g., retransmission for reliable delivery, packetization and reassembly, flow control, congestion avoidance, etc., when these are required. The fairly complex conventionally accomplished coupling between IP and TCP will be mirrored in the coupling between UDP and many applications using UDP. By default, a streaming program use, UDP to send data, TCP/IP or HTTP being too slow for it. A streaming application can allow a small data loss; this would not be even noticed from an end-user. Therefore, it is correct that UDP can be used when less stringent requirements.

The heart beat messages can be sent using a more reliable transport protocol since, as described above, HB messages are vital to the existence of the communication session. Alternatively, and depending on the Server Process tolerance, HB messages also may be sent over the unreliable type transport protocol. FIG. 3 does not show how CLOSE and ABORT messages are exchanged. These message types are preferably sent using a reliable transport protocol.

It should be noted how the described message flow requires the existence of a communication channel that allows the Client Host to communicate with the Server Host, a so called return channel. While this is a valid assumption for many wired networks, it may not be technically feasible or economically acceptable for satellite network or terrestrial broadcast networks. These types of networks typically implement only a forward communication path (Server to Client) and do not support a return channel that allows receiving devices to send information from the Client back to the Server. In order to support bidirectional services, service providers sometimes combine unidirectional wireless networks with wired network, for the purpose of complementing the existing forward link with the necessary return link. This approach increases the complexity and the costs of the implemented solution to a level that may discourage the service provider from adopting it.

The system shown in FIGS. 1-3 works well when only a few Clients are simultaneously requesting content from the same Server. Unfortunately, depending on the Server configuration, once the maximum number of connected Clients is reached, the quality of the service provided can degrade rapidly. This degradation is typically caused by at least one of the following reasons:

1. Server scalability: the Server is asked to generate multiple streams of content at the same time. Depending on the Server configuration and resources, the Server throughput may be limited to a quantity less than the effective throughput necessary to satisfy requests from a number of Clients.

2. Bandwidth consumption: the amount bandwidth B necessary to satisfy multiple parallel requests of content from the same Server increases as a linear function of the bandwidth b of one content transmission and the number N of requesting clients (B~b*N). Depending on the network topology and resources available this amount of bandwidth required to satisfy multiple requests for content may exceed the overall bandwidth available for or allocated to this kind of transmission.

Moreover, the message flow described above requires the existence of a communication link from the Client to the Server, a so called return channel. While this requirement is typically satisfied in wired networks, existence of such a communication link may not be a valid assumption for unidirectional networks like satellite or terrestrial broadcast networks.

In the past, client-server applications that included unicast transmission capabilities, such as described above, had to be reengineered in order to take advantage of multicast or unidirectional networks. Various multicast capable applications designed around an open architecture exist on the market, such as Real System G2, Microsoft Windows Media, etc., but do not support unidirectional transmissions The re-engineering task typically requires a more or less large investment of resources depending on the complexity of the application. It also increases the time required to place an existing application on the market. As a consequence, not all unicast applications have been modified to support multicast transmissions on unidirectional networks. Also, none of the above-listed systems can be used to enable an application designed around a unicast protocol to take advantage of a multicast environment without a re-engineering effort and its corresponding costs being applied to the application.

SUMMARY OF THE INVENTION

This invention relates to a system and method to overcome the problems of Server scalability and bandwidth consumption by enabling unicast transmissions over a unidirectional network and eliminating the need of a return channel. In the practice of the invention, a client emulation process and one or more server emulation processes are introduced respectively between the original Server Process and Client Process. The new emulation components act to encapsulate the UDP datagrams of the unicast stream within a multicast transport protocol, route this multicast traffic to a plurality of receiving Clients and finally recreate the original unicast stream on the side of each of the multiple Clients before sending it to the client application process of a targeted Client.

The present invention makes it possible to deploy a client-server application designed around a connection-less application protocol, such as UDP, on a multicast network. In particular, the application can be deployed on the multicast network without reengineering work, thereby reducing costs and the time required to bring an application to market.

Moreover, the invention also makes it possible to deploy the same application on a unidirectional network, i.e., on a network that does not allow communication from the client back to the server, thereby opening new market opportunities for the application.

The present invention enables the deployment of a client-server application on a multicast network in a way that permits multiple Clients to effectively receive the very same unicast transmission, i.e., simultaneously receive the same content from the same Server. This goal is achieved without reengineering the client-server application. Instead, software processes are introduced so that the distribution of the same unicast content transmission to additional Clients is completely transparent to the existing Client Processes at the Client side and server processes at the Server side. These new software emulation processes are placed on each of the Server and Client side of the network. In describing the invention, the Server side process is hereafter called Client Emulator Process and the Client side process is called Server Emulator Process. The Client and Server Emulator Processes completely hide the complexity of the multicast network to the Client Process at the Client and the Server Process at the Server. Moreover, the Client and Server Emulator Processes can be used to distribute additional specific information related to the communication session. Examples of this information are:

1. Encoding parameters of audio/video streaming transmissions that are sent to the Client Process prior to the audio/video stream, in order to allow the Client Process to load the necessary decoding technology. For example, Microsoft Windows Media technology requires that the receiving client has access to the a so called NSC file, which contains information such as the multicast IP address, port, stream format, and other station settings that Windows Media Player uses to connect to and play a multicast stream.

2. Announcements of specific sessions. This additional information is necessary in order to coordinate the Client Processes, taking full advantage of the multicasting capabilities. This mechanism is explained in detail below.

The preferred embodiment of the invention deals with client-server applications that use the unreliable transport UDP for delivering DATA messages. While this is the preferred solution for almost every client-server system currently on the market, there may be other systems which rely on TCP, which is more reliable than UDP, for the delivery of DATA messages. The system of the invention also can operate using much more reliable protocols As explained above, a reliable transport costs processing time and requires a back channel. The invention provides the possibility to easily adapt a system usually working in a bi-directional network, to work in uni-directional networks.

BRIEF DESCRIPTION OF THE DRAWINGS

Other objects and advantages of the present invention will become more apparent upon consideration of the following Specification and annexed drawings, in which.

DETAILED DESCRIPTION OF THE INVENTION

Figure 4:
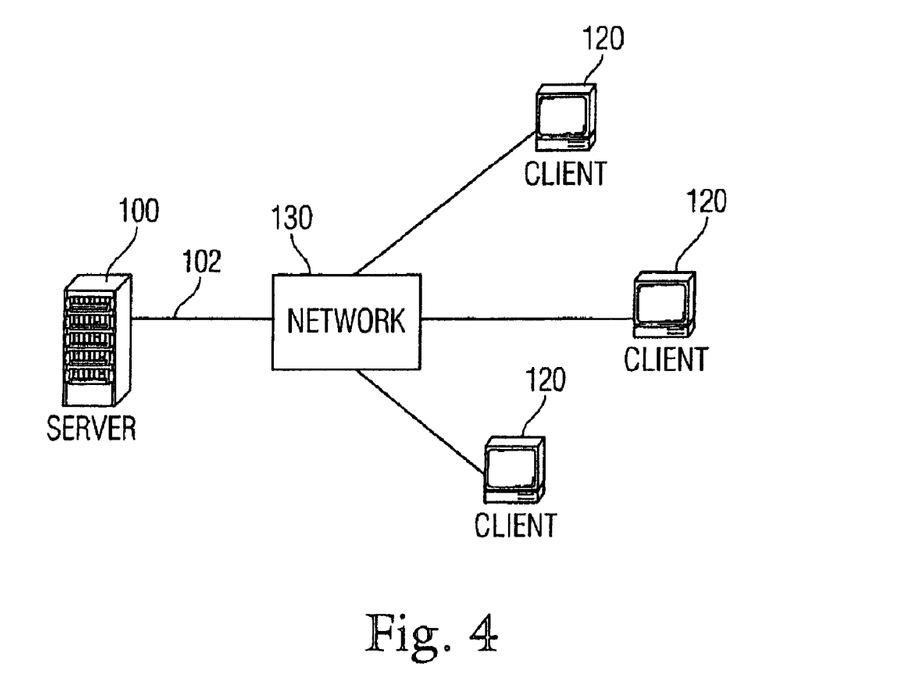
FIG. 4 is a diagram showing the general client-server topology in which the invention is used.

An example of a target topology in which the invention can be used is illustrated in FIG. 4. As shown, a Server 100 is engaged in a communication session with three distinct Client hosts 120 each of which executes its respective own Client Process 230. There can be fewer or more Client hosts. The communication is carried out over a public or private network 130 capable of supporting the TCP/IP protocol suite. In particular, the network 130 supports IP multicasting. Any conventional network capable of supporting IP multicasting can be used.

In FIG. 4 if the Client Process 230 of each of the plurality (three shown) of Client Hosts 120 would simultaneously establish a private unicast communication session with the Server Process 220 executed by the Server 100, the total amount of bandwidth B required to deliver the same content to all three Client Processes 230 (measured on the link 102) would amount to three times the bandwidth b allocated to a session with a single Client Process 230. In general, if N Client Processes would simultaneously request the same content from the same Server Process in a unicast protocol, the total amount of bandwidth B required to deliver the content to all of the Client Processes would be:

$$B=N*b \quad (1)$$

where b is the amount of bandwidth required to deliver the content to a single Client Process.

A similar analysis can be made for other resources of the single Server Process, such as the total size of allocated buffer and the total amount of CPU time, when sought to be accessed by multiple Client Processes.

Figure 5:
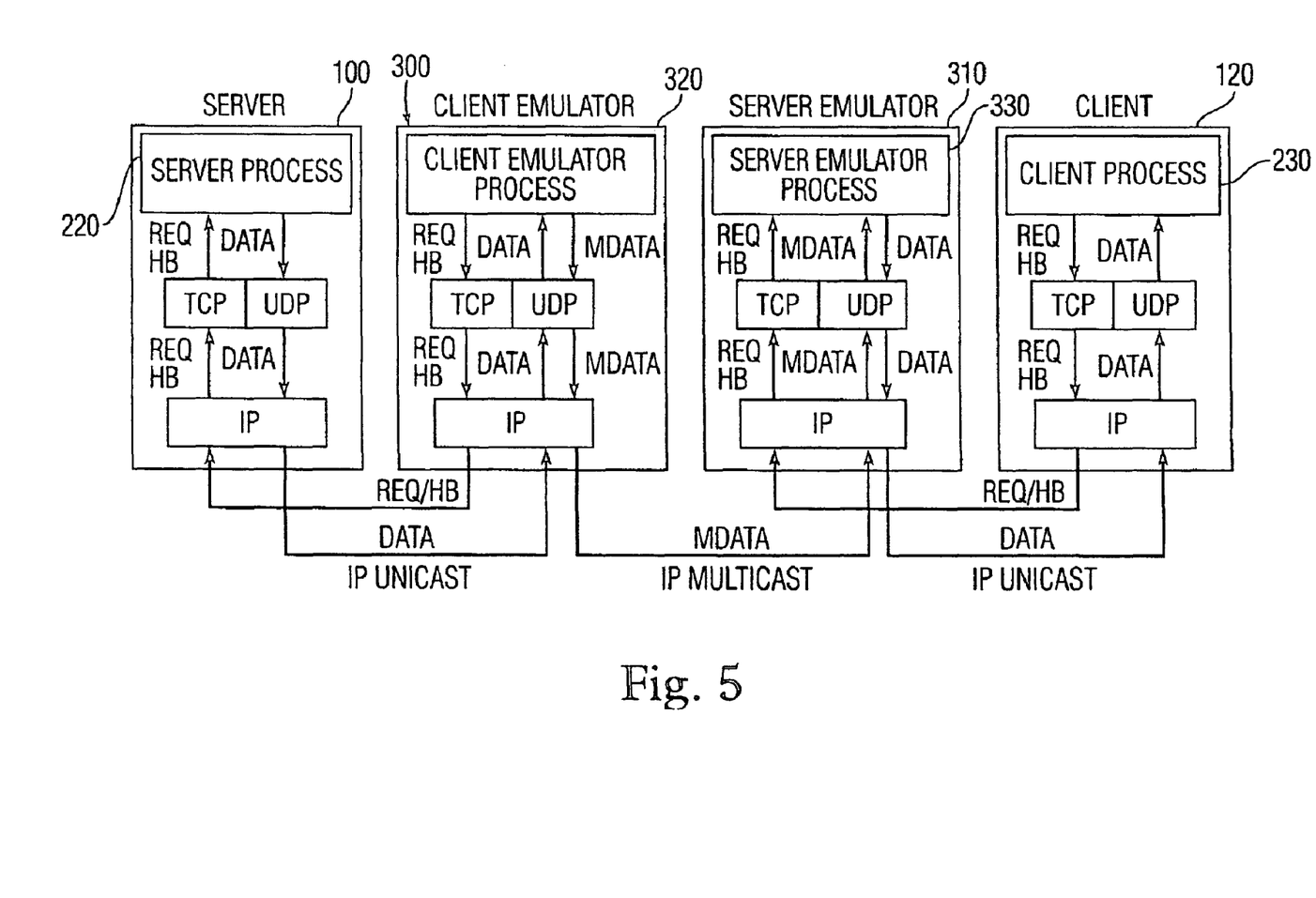
FIG. 5. is a diagram illustrating operating principles of the invention.

Referring to FIG. 5, according to the preferred embodiment of this invention, the Server 100 hosts a Client Emulator 300 that executes a Client Emulator Process 320. Server 100 also executes a conventional Server Process 220. A Server Process 20 is responsible to manage and distribute the requested data. This is well known in the literature on client/server systems. In accordance with the invention, every Client 120 hosts an associated Server Emulator 310 that executes a conventional Server Emulator Process 330. The Client Emulator Process 320 associated with the Client Emulator 300 of the Server 100 and each Server Emulator Process 330 associated with the Server Emulator 310 of each Client 120 may reside on separate Emulator 300 and 310, as illustrated in FIG. 5. That is, as shown in FIG. 3, to the Server 100 is added the necessary circuitry and software to form an emulator 320 of a Client with a process that emulates a Client, i.e., a Client Emulator Process 320. Similarly, to each Client is added the necessary circuitry and software to form an emulator of the Server and a process that emulates the Server, i.e., a Server Emulator Process 330.

Figure 6:
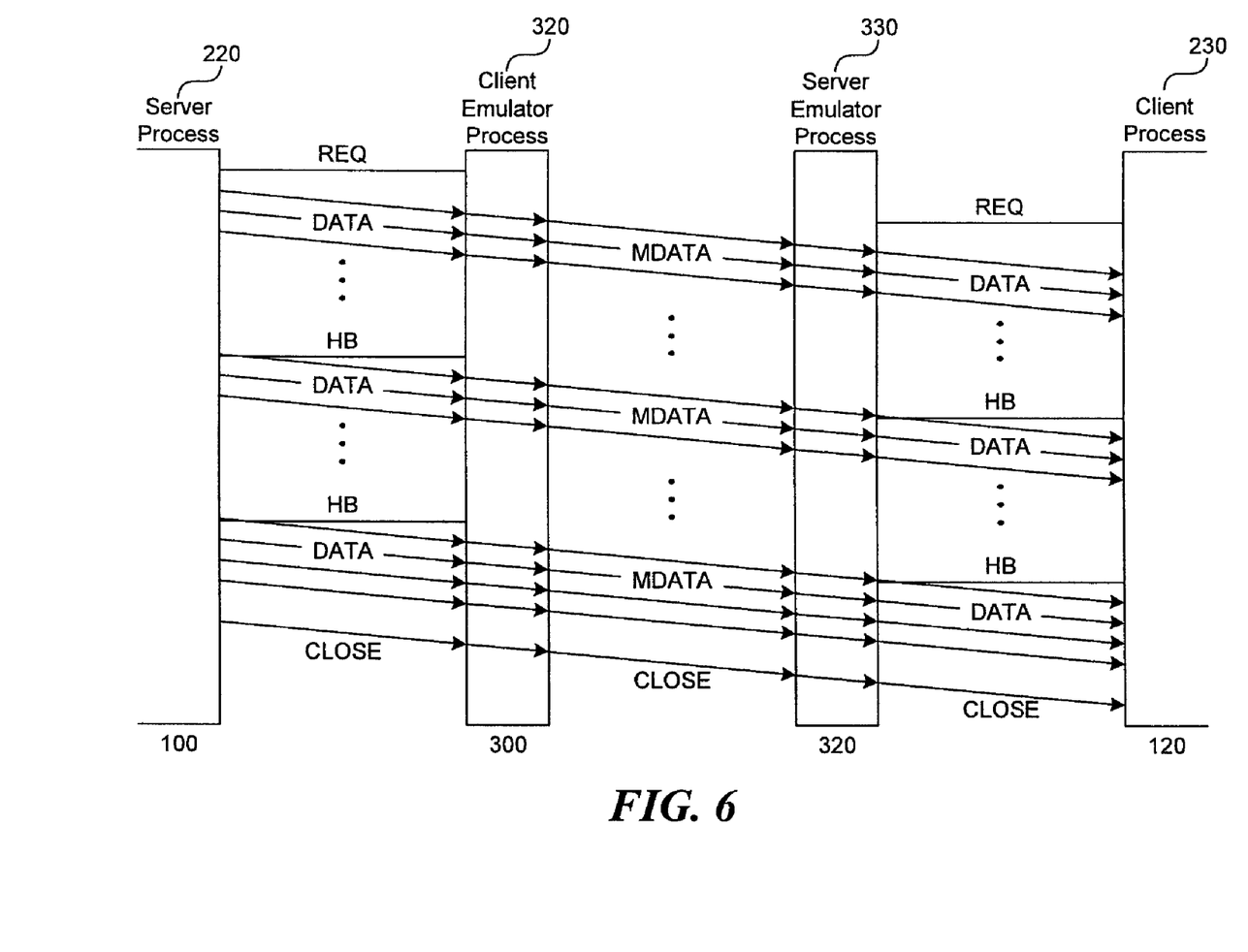
FIG. 6 is a diagram illustrating the flow of signals between various components of the system of FIG. 4.

FIG. 6, going from top to bottom, illustrates the flow of messages exchanged among Server Process 220, and Client Emulator Process 320 of the Server 100 and the Server Emulator Process 330 and Client Process 230 of each Client 120. The responsibilities of the respective Client emulator process 320 (at the Server) and Server Emulator Process 330 (of each Client) are hereafter described.

The two Emulator Processes 320 and 330 act to "fool" the respective Client and Server processes 220 and 230 by behaving as a real peer process. That is, on the Server side, the Client Emulator Process 320 at the Server 100 talks to the Server Process 220 at the Server 100 so that the Server thinks that it is talking to a Client. Similarly, the Client Process 230 at each Client 120 talks to the Server Emulator Process 330 that it hosts as if it were talking to the Server. For this purpose, the Client Emulator Process 320 hosted by the Server 100 initiates a communication session with the Server Process 220 of the Server. Moreover, during the session, the Client Emulator Process 320 also regularly sends heart beat messages HB to the Server Process 220.

On the Client side the Server Emulator Process 330, accepts a request message REQ sent from the Client Process 230 to establish the communication session. The Server Emulator Process 330 on the Client side also sends the content to the Client Process 230 of the Client 120 as a sequence of DATA messages. As explained below, the DATA messages sent by the Server Emulator Process 330 to the Client Process 230 on the Client side are received from Client Emulator Process 320 on the Server side. The Server Process 220 at the Server also expects and accepts the heart beat messages HB, according to the client-server protocol described above.

On the Server side, the Client Emulator Process 320 acts to encapsulate each IP unicast data message DATA received from the Server Process 220 in an IP multicast datagram. The encapsulation is accomplished by replacing the IP unicast destination data in the datagram header with the IP multicast destination data pre-configured in the client emulator process. The encapsulated data, called MDATA, is sent over the Network 130 to the respective Server Emulator Process 330 at each of one or more clients. On the Client side, each Server Emulator Process 330, upon reception of an encapsulated data message MDATA, extracts the original data message DATA, packages it as an IP unicast message, and sends it to the associated Client Process 230 of the respective Client 120.

The above effectively results in the original client-server configuration being split into two client-server subsystems linked by a multicast connection. As seen, due to the unidirectional nature of the IP multicast link between the Server side Client Emulator Process 320 and the Client side Server Emulator Process 330, the Client Process 230 at the Client does not communicate directly with the Server Process 220 at the Server as in the original configuration described in FIGS. 1-3. Instead, in the preferred embodiment of the invention, the flow of messages is initiated by the Client Emulator Process 320 on the Server side by sending a request message REQ to the Server Process 220 specifying the desired content (see also FIG. 5). In operation, either the client emulator process is operated manually by a launch command introduced from the end user or automatically by a time driven program like a broadcast guide interpreter that starts the session when the indicated time arrives. The Server Process 220 at the Server accepts the request, establishes a communication session and sends the content as a sequence of DATA messages to the Client Emulator Process 320 at the Server. The Client Emulator Process 320 maintains the session alive by regularly sending back heart beat messages HB to the Server Process 220 at the Server.

Figure 7:
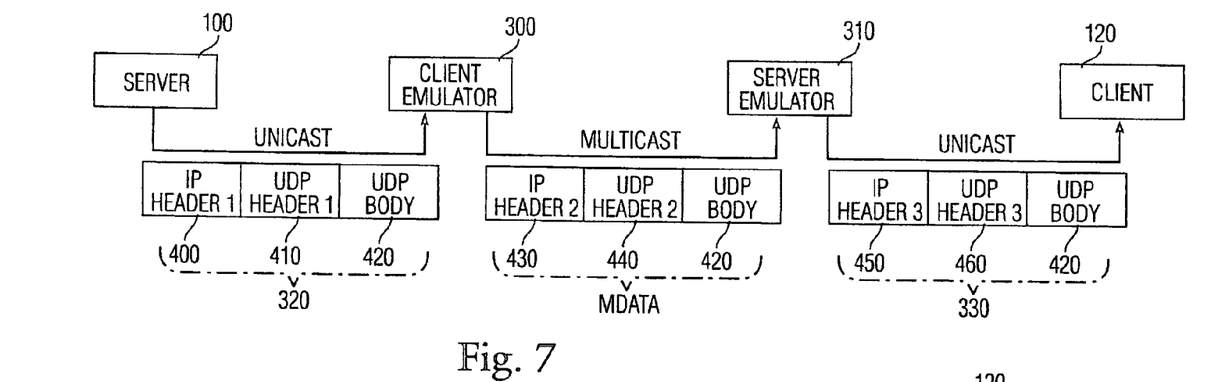
FIG. 7 is a diagram showing the communication between the Server and the Client.

As shown in FIG. 7, upon the Client Emulator 300 on the Server side receiving a DATA message from the Server Process 220 of the Server 100, the Client Emulator Process 320 extracts the UDP Body section 420 from the UDP datagram, as illustrated, by stripping off the IP header 1 in 400 and the UDP header 1 in 410. This is accomplished by suitable software. The Client Emulator Process 320 of the Client Emulator on the Server side then forwards on the Network 130 a new message MDATA in the form of a UDP/IP multicast datagram with the original UDP Body Section 420. The IP address and destination port of the multicast datagram are known by the Client Emulator Process 320 on the Server side and by Server Emulator Process 330 on the Client side (described below). Even if it depends on the specific application protocol, it is in general important that the Client Emulator Process 320 forwards the data without delay or with minimal delay. In fact, in case of audio/streaming protocols, unexpected delays between subsequent datagrams can reduce the quality of the end-user experience by increasing the latency and causing a phenomenon known as jitter.

In the operation of the system shown in FIGS. 6 and 7, on the Client side, the Client Process 230 sends a request message REQ to its hosted Server Emulator Process 330 requesting the desired content. Depending on the time of the request, the following situations may occur:

1) The Client side Server Emulator Process 330 receives the REQ message before the first MDATA message has arrived from the Client Emulator Process 320 on the Server side. In this case the Server Emulator Process 330 at a Client can either join the IP multicast session waiting for the arrival of MDATA message or simply reject the request.

2) The Client side Server Emulator Process 330 receives the REQ message while MDATA messages from the Server are "on air". The Server Emulator Process 330 joins the IP multicast session and detects MDATA messages. Therefore it accepts the request message REQ from its associated Client Process 230, establishes the session with the Client Process 230 and starts creating and sending DATA messages to the Client Process 230 at the Client 120. DATA messages are UDP/IP unicast datagrams that carry the original UDP Body 420. The IP Header 450 and the UDP Header 460 are configured according to the Client Process 230 request. Different solutions can be used to affect the configuration. For example, (1) there can be used a configuration file shared by both processes (server emulator process and client process); (2) the data is sent with the broadcast guide information. This data is shared by both processes as explained below. If both processes run on the same machine the server emulator process sends the data on the local host and next available port on the machine. The server emulator process communicates to the client the available port either through an API (if available by the client) or through a configuration file. (4) A configuration user interface can be implemented to introduce this data that will be shared by both processes.

3) The Server Emulator Process 330 on the Client side receives the REQ message after the last MDATA message has arrived from the Client Emulator Process 320 on the Server side. In this case the Client side Server Emulator Process 330 can only reject the request.

Alternatively, the Server Emulator Process 330 on the Client side has knowledge of the transmission schedule. Such a schedule is typically managed by the service provider and distributed in advance to all receiving Clients 120. Knowing the transmission schedule, the Server Emulator Process 330 can easily decide to accept or reject a REQ message from the Client Process 230 from any one of the Clients.

It should be understood that some client-server technologies are capable of generating a native IP multicast stream but do require that the Client obtains from the Server an announcement of the multicast session. This could be sent with broadest gide information. An example of such a technology is Microsoft Windows Media technology. In this technology, the Client typically achieves this goal by retrieving a file from the Server containing the necessary information to join the multicast session and to correctly receive the content. In the system of the present invention, this retrieval of the file on the server does not take place. Instead, the file has to be sent in advance to the client using, for example, broadcast guide information distribution. In this scenario, the Client Emulator Process on the Server side does not need to package the content in a new multicast stream (MDATA). Instead, the role of the Client Emulator Process is merely to distribute to the Server Emulator Process 330 at each Client the multicast session announcement and to route the original stream onto the multicast network. In a similar way, the Server Emulator 310 at the Client does not need to repackage the received content (MDATA) in a unicast stream. It only needs to route it to the destination Client Process 230. Even if the importance of the Client Emulator Processes is reduced, their contribution is still relevant, as they allow the deployment of a multicast capable client-server application on a pure unidirectional network.

In the embodiment of FIGS. 6 and 7, only one Client Process 230 is shown communicating at a given time with a specific Server Emulator Process 330 at one or more Clients 120. In a further embodiment illustrated in FIG. 8, it is possible to allow multiple Client Processes 230 to simultaneously communicate with the same Server Emulator Process 330. This configuration is useful when the Client Processes associated with a plurality of Clients 120 have access to one Server Emulator Process 330 through a local area network, and the one Server Emulator Process is deployed on a dedicated device. In this configuration, a single Server Emulator Process 330 serves as a common gateway between the Client Processes at the multiple Clients and the multicast network.

Figure 8:
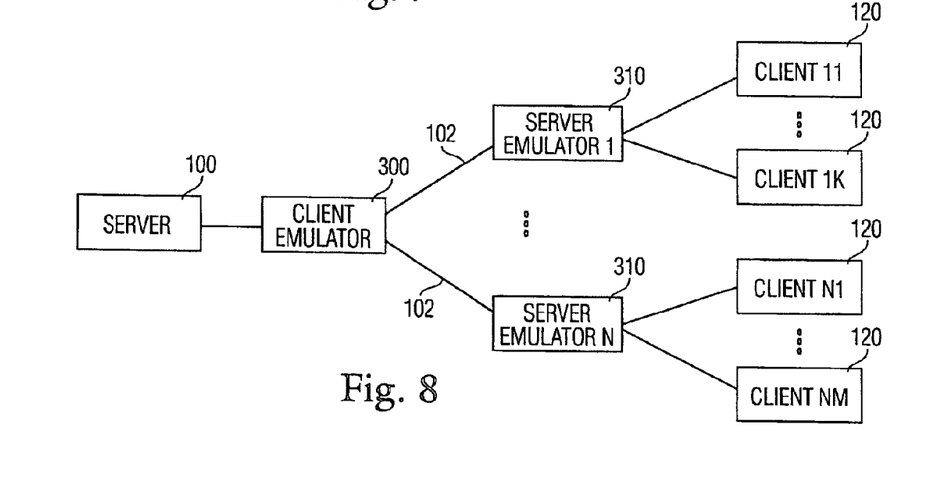
FIG. 8 is a diagram of an alternative embodiment of the invention in which on the Client side one Server Emulator Process communicates with a plurality of Client Processes.

Referring to FIG. 8, there is the Server 100 that hosts a Client Emulator 300 that has a Client Emulator Process 320. The output of the Client Emulator 300 is shown as being to a plurality of Server Emulators 310-1 ... 310-N on the Client side. The Client side can be of the local network type. For example, each Server Emulator 310 services a plurality of Clients 120. Each Server Emulator 310 executes a respective Server Emulator Process 330 to in turn communicate with a plurality of Clients 120. For example, Server Emulator 310-I communicates with Clients 120-1_ through 1K. The Server Emulator 310-N is illustratively shown as communicating with Clients N1 through NM.

One of the benefits of the embodiment of FIG. 8 is that the amount of resources required by one Server to support multiple Clients is no longer a linear function of the number N of Clients 120. Instead, the amount of resources required to distribute content to multiple Clients 120 remains constant from the server 100, regardless on how many Clients are interested in receiving the content. In particular, the amount of bandwidth B allocated to the entire service for all of the Clients 120 measured on the link 102, is equivalent to the amount of bandwidth b required to serve a single client.

$$B \sim b \qquad (2)$$

The benefit of the multicast transmission is that the data is sent once to a multicast address and each of the server emulators connects and listens at this address.

In concrete terms, this means that the cost of adding a Client 120 to the system is basically limited to the initial infrastructure investment of the Server and the number of Client stations. Moreover, the quality of the service provided does not degrade as new clients are added to the system.

Figure 9:
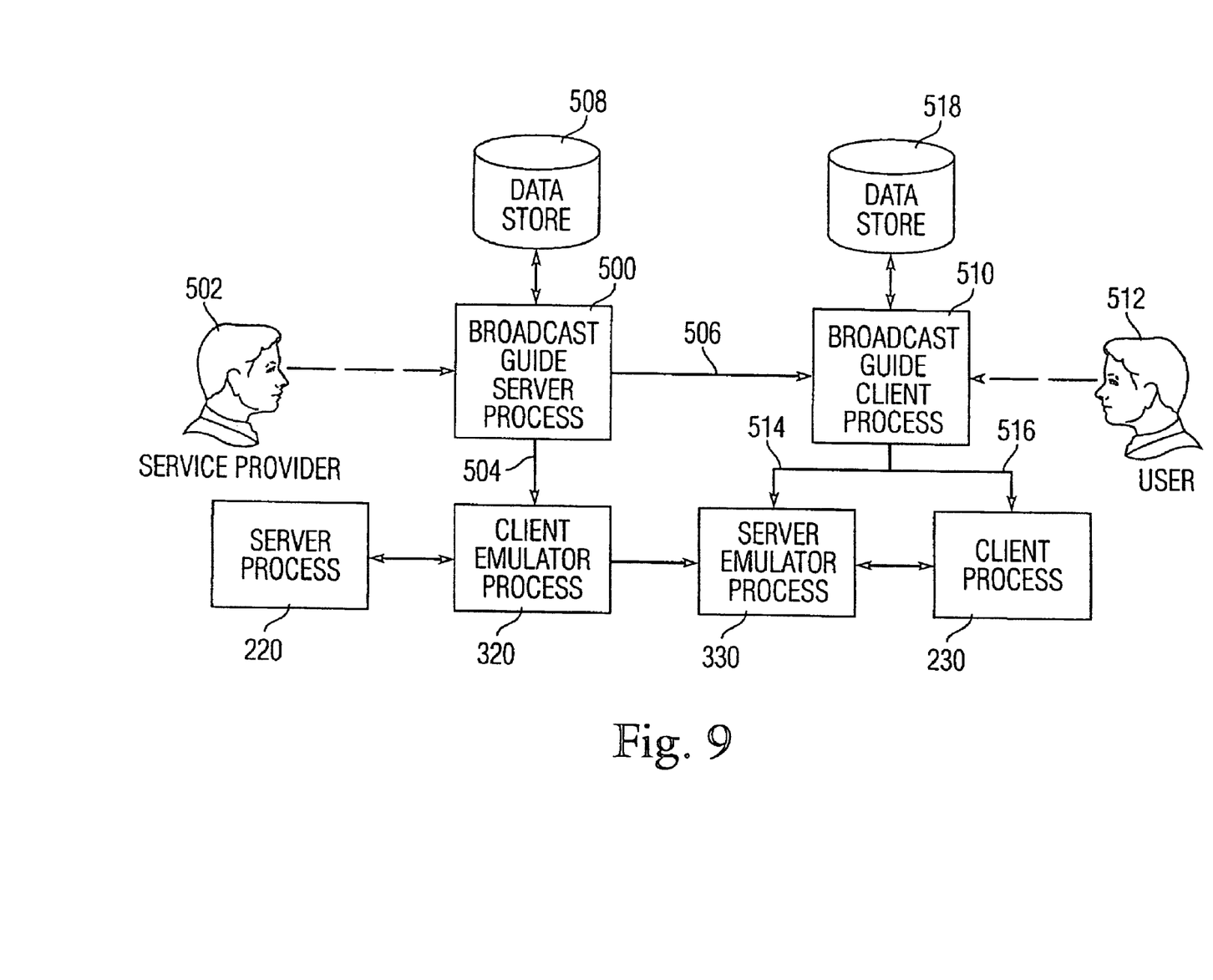
FIG. 9 is a diagram of a configuration for broadcasting announcements.

As mentioned above, a key mechanism of the invention is the ability for a service provider to distribute information about single transmissions, called here an "announcement", to the various Client receiving systems. A set of announcements is, for example, a broadcast guide and it defines a transmission schedule, such as of programs, over a given time period. Announcements play a fundamental role as they enable a Server Emulator Process 330 at a Client to receive the multicast data stream and pass it to the associated Client Process 230. FIG. 9 illustrates how announcements are generated, distributed and used in a preferred embodiment.

In FIG. 9, the announcement is a file or part of a file that contains in digital form at least the following components: an address or header; at least a unique content identifier; a descriptive title for the content to be transmitted; the date and time of the transmission; the type of application protocol used; and the IP multicast and port to which the content will be sent. Instead of specifying the type of application protocol used, the announcement can indicate the type of content by its MIME type (Multipurpose Internet Mail Extension). As is known and documented in the literature, MIME is used by browsers to link the appropriate plug-ins or helper applications to consume the data. MIME is a specification for formatting non-ASCII messages so that they can be sent over the Internet. An E-mail Client that supports MIME enables them to send and receive graphics, audio and video files via the Internet mail system.

The announcement can also include additional information as, for example, a more extensive description of the content, the duration of the transmission, and information on rating, price, producer and quality. Examples of such an announcement format are the Session Description Protocol SDP, known from the Mbone initiative (which is short for Multicast Backbone on the Internet) Mbone is an extension to the Internet to support IP multicasting—two-way transmission of data between multiple sites, or Microsoft Windows Media Announcement File (as described in the on-line Microsoft Library).

In FIG. 9, the Service Provider 502, considered to be an entity directed by human intervention, typically interacts with a Broadcast Guide Server Process 500 to define and produce the broadcast guide. The Process 500 is a software application program. While the Broadcast Guide Server Process 500 is preferably hosted on a Server 100, previously described, it can also be hosted on a separate server. In a preferred embodiment, the user interface offered by the Broadcast Guide Server Process 500 allows the Service Provider 502 to graphically define and directly manipulate the broadcast guide and its announcements. A system and method for accomplishing this is described in U.S. patent application Ser. No. 09/738, 390, filed Dec. 15, 2000, entitled "Decision Support System and Method for Planning Broadcast Transmissions, which is assigned to the Assignee of this application and whose disclosure is incorporated herein by reference in its entirety. Alternatively, the user interface can also be as simple as a command line application or a text editor. Moreover, although the Service Provider 502 typically interacts locally with the Broadcast Guide Server Process 500, he or she can also interact with this process from a remote station, provided that an appropriate communication connection is available.

The broadcast guide 500 defined by the Service Provider 502 is temporarily stored in a local Data Store 508, which can be any suitable storage media, such as a hard disk. This ensures that the broadcast guide data is stored for use in the event of a failure of the Broadcast Guide Server Process 500. As soon as an announcement is defined, the Broadcast Guide Server Process 500 sends it to a Broadcast Guide Client Process 510 over a link 506. This corresponds to the Client Process 230 previously defined with respect to FIGS. 4-8. In a preferred embodiment, this transmission occurs periodically over the multicast type Network previously described. The periodic retransmission of the same announcement increases the probability that the announcement is effectively received by the Broadcast Guide Client Process 510. Alternatively, the announcement can be sent once using any other reliable transport mechanism such as e-mail or FTP. Upon reception, the announcement is stored on the Client side in a local Data Store 518 to the Broadcast Guide Client Process 518.

The User 512 at the Client side can view the broadcast guide through the Broadcast Guide Client Process 510, which preferably offers a graphical user interface. As an alternative, the User 512 can view a locally stored textual report listing all announcements.

At the time at which the transmission is supposed to start, the Broadcast Guide Server Process 500 signals a request to send the content to a Client Emulator Process 320 at the Server side by passing relevant announcement parameters such as the unique content identifier and the IP multicast address and port on which the content is to be sent. As a consequence, the Client Emulator Process 320 operating with a Server Process 220 initiates the message exchange described in FIG. 6. The Broadcast Guide Server Process 500 action is preferably triggered by a process internal timer, which is part of the application program. In absence of an automatic mechanism, the action can be manually triggered by the Service Provider 502.

Similarly, as the transmission time approaches, the Broadcast Guide Client Process 510 on the Client side signals the request to receive the transmission to the Server Emulator Process 330 passing to the Broadcast Guide Client Process 510 relevant announcement parameters such as the unique content identifier and the IP multicast address and port on which the content can be expected. In a preferred embodiment, immediately after having signaled the Server Emulator Process 330 of the Client, the Broadcast Guide Client Process 510 also signals the Client Process 230 at the Client by passing the unique content identifier. This second action is only possible if the Client Process 230 offers a programmatic interface that can be used to direct the Client Process from an external software process. In absence of such a process, the User 512 has to manually signal the Client Process 230, for example by starting the application and manually issue those commands necessary to initiate the content request. If there is no user interface then the user has to launch the client application manually introducing the appropriate commands to request the content by the server emulator process. Those commands can be different from a client to the other.

The actions of the Broadcast Guide Client Process 510 are preferably initiated by the User 512 at the Client, who thereby indicates an interest in receiving the content. Alternatively, the actions can also be initiated at a Client by a timer internal to the Broadcast Guide Client Process 510 itself. An automatic mechanism is particularly useful when the Client Process 230 is not involved in a viewing application but an unattended background process. this occurs, for example, when the client only stores the data but it does not display it. If a timer is used to initiate the action, a clock of the Server Emulator Process 330 at the Client has to be synchronized with a clock at the Client Emulator Process 320 at the Server. This synchronization ensures that the Client is ready to receive the content from the Server when this is effectively sent. It should be noted that, as described above, the Client user 512 can decide to view the content at any time that the content is "on air", i.e., before the last MDATA message has arrived.

The client emulator process 320 sends the data to the multicast address to which the server emulator process 220 listens. This multicast address can be pre-configured for the entire system or can be sent with the broadcast guide information sent on a pre-configured multicast address. The other parts do not interact with each other. The server process interacts only with the client emulator process and the client process interacts only with the server emulator process as described above with respect to FIG. 5.

Specific features of the invention are shown in one or more of the drawings for convenience only, as each feature may be combined with other features in accordance with the invention. Alternative embodiments will be recognized by those skilled in the art and are intended to be included within the scope of the claims.

We claim:

1. A system for providing multicast transmission of real time data content over a network between a server and a plurality of clients, comprising:
    one or more processors;
    a component of a server configured to use at least one of the processors to operate a server process configured to provide unicast form data to a client emulator process; and
    a client emulator at the server configured to use at least one of the processors to operate a client emulator process configured to convert the unicast form data into multicast form data for transmission to the plurality of clients over the network,
    wherein the client emulator sends a periodic heartbeat message to the server process when a session is active.

2. The system as claimed in claim 1 further comprising a broadcast guide server process on the server configured to communicate with the client emulator process to transmit broadcast guide data.

3. The system as claimed in claim 1 wherein the client emulator process further comprises a converter configured to convert unicast form data to multicast form data and to transmit the multicast form data to the plurality of clients.

4. The system as claimed in claim 3 wherein the unicast form data includes internet protocol destination data in a header and the converted multicast form data includes the internet protocol destination data for a client of the plurality of clients.

5. The system as claimed in claim 1 wherein the client emulator process is configured to request the server process to transmit data to the plurality of clients.

6. The system as claimed in claim 5 wherein the client emulator process is configured to receive a signal from a client indicating that data content is being received by the client.

7. The system as claimed in claim 6 wherein the server process is configured to transmit a close transmission signal that is forwarded to the client emulator process, and the client emulator process is configured to forward the close transmission signal to each of the plurality of clients to close the transmission.

8. A method for providing multicast transmission of data content over a network between a server and each of a plurality of clients, comprising:
    operating a server process application at the server to originate unicast form data;
    providing the unicast form data to a client emulator at the server configured to operate a client emulator process configured to convert the unicast form data into multicast form data;
    transmitting the multicast form data from the client emulator process at the server to the plurality of clients; and
    under control of a server emulator process operating at each of the plurality of clients,
    receiving the multicast form data,
    extracting unicast form data from the multicast form data, and
    providing the extracted unicast form data to a client process operating on each of the plurality of clients configured to receive the unicast form data from the server emulator process,
    wherein each of the plurality of clients does not transmit data to the server during the transmission of multicast form data.

9. The method as claimed in claim 8 further comprising providing on the server a broadcast guide server process configured to communicate with the client emulator process and with the plurality of clients to transmit broadcast guide data.

10. The method as claimed in claim 8, further comprising:
converting, by the client emulator process, the original unicast form data received from the server process to multicast form data; and
transmitting, by the client emulator process, the multicast form data to the plurality of clients.

11. The method as claimed in claim 10 wherein the original unicast form data includes internet protocol destination data in a header and the converted multicast form data includes the internet protocol destination data for each of the plurality of clients.

12. The method as claimed in claim 8 further comprising operating the client emulator process to request the server process to transmit data to a client of the plurality of clients.

13. The method as claimed in claim 12, further comprising, receiving, by the client emulator process, a signal from a client indicating that data content is being received by the client.

14. The method as claimed in claim 13, further comprising in response to receiving at the client emulator process a close transmission signal from the server process, forwarding, by the client emulator process, the close transmission signal to each of the plurality of clients to close the transmission.

15. A computer storage device having instructions stored thereon, the instructions comprising:
instructions for causing a client emulator operating at the server to,
receive unicast form data from a server process application operating at the server, wherein the server process application operating at the server is configured to originate the unicast form data,
convert the unicast form data into multicast form data, and
transmit the multicast form data over a network to a plurality of clients; and
instructions for causing a server emulator operating at each of the plurality of clients to,
receive the transmitted multicast form data, and
convert the transmitted multicast form data into unicast form data,
wherein the plurality of clients do not transmit data to the server during the multicast transmission of data.

16. The computer storage device of claim 15, the instructions further comprising:
instructions for providing on the server a broadcast guide server process configured to communicate with the server client emulator process and with a client of the plurality of clients to transmit broadcast guide data.

17. The computer storage device of claim 15, wherein the unicast form data includes internet protocol destination data in a header and the converted multicast form data includes the internet protocol destination data for each of the plurality of clients.

18. The computer storage device of claim 15, the instructions further comprising:
instructions for operating the client emulator process to request the server process to transmit data to a client of the plurality of clients.

19. The computer storage device of claim 18 the instructions further comprising:
instructions for operating the client emulator process to receive a signal from a client indicating that data content is being received by the client.

20. The computer storage device of claim 19, the instructions further comprising:
instructions for operating the server process to transmit a close transmission signal, and forwarding the close transmission signal to the client emulator process and then to each of the plurality of clients to close the transmission.

21. A system for providing multicast transmission of real time data content over a network from a server to a client, comprising: at least one processor and a server emulator operating at the client and configured to operate, with the at least one processor, a server emulator process configured to receive a multicast form datagram from the server, extract unicast form data from the multicast form datagram, and provide the extracted unicast form data to a client process operating at the client, wherein the received multicast form datagram has been produced by a client emulator process operated on the server from unicast form data originated by a server process application operated by the server.

22. The system as claimed in claim 21 further comprising a broadcast guide client process configured to communicate with the server emulator process to receive broadcast guide data.

23. The system as claimed in claim 21, wherein the server emulator process is a common server emulator process configured to receive the multicast form datagram from the server and communicate with a plurality of clients, wherein each of the plurality of clients is configured to operate a client process configured to receive the extracted unicast form data from the common server emulator process.

24. The system as claimed in claim 21 wherein the server emulator process includes means to convert the multicast form datagram to unicast form data and forward the unicast form data to the client process.

25. The system as claimed in claim 24 wherein the multicast form datagram includes the Internet protocol destination data for a plurality of clients and the unicast form data includes internet protocol destination data in a datagram header.

26. The system as claimed in claim 21 wherein the client process is configured to produce a signal indicating that data content is being received.

27. The system as claimed in claim 26 wherein the server emulator process receives a close transmission signal from the server and thereafter forwards the close transmission signal to the client process to close the transmission.

28. A method for providing multicast transmission of data content over a network between a server and a client, comprising:
operating a server emulator process on the client configured to receive multicast form data from the server and extract unicast form data from the multicast form data wherein the received multicast form data has been produced by a client emulator process operated on the server from unicast form data originated by a server process application operated by the server; and
providing the extracted unicast form data to a client process on the client configured to receive the unicast form data from the server emulator process, wherein the client does not transmit data to the server during the multicast transmission of data.

29. The method as claimed in claim 28 further comprising providing on the client a broadcast guide client process configured to communicate with the server emulator process to receive broadcast guide data.

30. The method as claimed in claim 28 wherein the client comprises a server emulator configured to operate the server emulator process.

31. The method as claimed in claim 28 further comprising providing the extracted unicast form data to a plurality of clients, wherein each of the plurality of clients is configured to operate a client process configured to receive the extracted unicast form data from a common server emulator process, wherein the common server emulator process is common to each of the plurality of clients.

32. The method as claimed in claim 28 wherein the multicast form data includes the internet protocol destination data for a plurality of clients and the converted unicast form data includes internet protocol destination data in a datagram header.

33. The method as claimed in claim 28, further comprising:
producing, by the client process, a signal indicating that data is being received.

34. The method as claimed in claim 33, further comprising:
in response to receiving at the server emulator process a close transmission signal, forwarding the close transmission signal to the client process to close the transmission.

35. A computer storage device for enabling multicast transmission of data content over a unidirectional network between a server and a plurality of clients, wherein the unidirectional network does not allow communication from the plurality of clients to the server, the computer storage device storing computer-executable instructions comprising:
instructions for operating a server emulator process configured to receive multicast form data from the server via the unidirectional network and extract unicast form data from the multicast form data; and
instructions for providing the extracted unicast form data to a client process configured to receive the unicast form data from the server emulator process,
wherein the server emulator process receives a periodic heartbeat message from the client process without sending an indication of the periodic heartbeat message to the server.

36. The computer device of claim 35, storing computer-executable instructions for providing a broadcast guide client process configured to communicate with the server emulator process to receive broadcast guide data.

37. The computer storage device of claim 35, wherein each of the plurality of clients comprises a server emulator configured to operate a server emulator process configured to receive the multicast form data from the server.

38. The computer storage device of claim 35, further storing computer-executable instructions for providing the extracted unicast form data to a plurality of clients, wherein each of the plurality of clients is configured to operate a respective client process configured to receive the extracted unicast form data from a common server emulator process.

39. The computer storage device of claim 35, further storing computer-executable instructions comprising:
instructions for receiving the multicast form data at the server emulator process;
instructions for converting the multicast form data to unicast form data; and
instructions for forwarding the converted unicast form data to the client process.

40. The computer storage device of claim 39, wherein the multicast form data includes the internet protocol destination data for a plurality of clients and the converted unicast form data includes internet protocol destination data in a datagram header.

41. The computer storage device of claim 35, the computer storage device further storing computer-executable instructions comprising: instructions for producing, by the client process, a signal indicating that data is being received.

42. The computer storage device of claim 41, further storing computer-executable instructions comprising: instructions for, in response to receiving at the server emulator process a close transmission signal from the server, forwarding the close transmission signal to the client process to close the transmission.

43. The method of claim 8 wherein the client emulator process and the server emulator process are provided by a first source.

44. The method of claim 43 wherein the server process and the client process are provided by a second source different from the first source.

45. The system of claim 21 wherein the network is a unidirectional network that does not allow communication from the client to the server.

* * * * *